United States Patent [19]

Metz et al.

[11] Patent Number: 5,592,157
[45] Date of Patent: Jan. 7, 1997

[54] RELATIVE VISIBILITY MEASURING PROCESS AND DEVICE

[75] Inventors: Juergen Metz, Wettenberg; Joachim Tiedeke, Achberg/Esseratsweiler, both of Germany

[73] Assignee: Leica AG, Heerbrugg, Switzerland

[21] Appl. No.: 411,695

[22] PCT Filed: Oct. 1, 1993

[86] PCT No.: PCT/EP93/02689

§ 371 Date: Apr. 5, 1995

§ 102(e) Date: Apr. 5, 1995

[87] PCT Pub. No.: WO94/08254

PCT Pub. Date: Apr. 14, 1994

[30] Foreign Application Priority Data

Oct. 5, 1992 [DE] Germany ............ 42 33 379.2

[51] Int. Cl.⁶ .................................................. G08G 1/09
[52] U.S. Cl. ................ 340/905; 340/601; 356/338
[58] Field of Search .......................... 340/600, 601,
340/602, 905, 903, 425.5, 438, 901, 968,
580, 581, 582, 583; 73/170.16, 170.17;
348/31, 122, 135; 356/338, 342, 437, 438

[56] References Cited

U.S. PATENT DOCUMENTS

| | | | |
|---|---|---|---|
| 3,519,354 | 7/1970 | Brown, Jr. et al. | 356/103 |
| 3,694,936 | 10/1972 | Ling et al. | 356/208 |
| 3,998,552 | 12/1976 | Stewart et al. | 356/342 |
| 4,419,731 | 12/1983 | Puffett | 356/342 |
| 4,502,782 | 3/1985 | Werner et al. | 356/342 |
| 4,760,272 | 7/1988 | Wang | 340/583 |
| 4,931,767 | 6/1990 | Albrecht et al. | 340/602 |
| 5,116,124 | 5/1992 | Huttmann | 356/342 |
| 5,118,180 | 6/1992 | Wichmann et al. | 340/602 |
| 5,200,792 | 4/1993 | Tajima et al. | 348/31 |
| 5,206,698 | 4/1993 | Werner et al. | 356/342 |
| 5,434,778 | 7/1995 | Nylander | 340/580 |
| 5,444,530 | 8/1995 | Wang | 356/338 |

FOREIGN PATENT DOCUMENTS

| | | |
|---|---|---|
| 0312524 | 12/1992 | European Pat. Off. . |
| 2266895 | 10/1975 | France . |
| 2156063 | 5/1972 | Germany . |
| 2513061 | 5/1977 | Germany . |
| 8912983 | 3/1990 | Germany . |
| 1150502 | 4/1969 | United Kingdom . |
| 1497214 | 1/1978 | United Kingdom . |
| 0441613 | 8/1991 | United Kingdom ............ 340/602 |

OTHER PUBLICATIONS

J. V. Winstanley, Automatic fog warning system, Mundo Electronico, pp. 39–44 Dec. 1976.

*Primary Examiner*—Jeffery Hofsass
*Assistant Examiner*—Timothy Edwards, Jr.
*Attorney, Agent, or Firm*—Foley & Lardner

[57] ABSTRACT

A relative visibility measuring process measures and stores a reference propagation time of a measurement pulse over a reference distance between a pulse propagation time rangefinder and a reflector under ideal conditions. A reference amplitude of a measurement pulse, which is reflected by the reflector under ideal conditions, is measured and stored. An actual signal which is equal to the time response of the received signals of the rangefinder under actual conditions, is measured and stored. A determination is made of an actual amplitude which is equal to the amplitude of a time element of the actual signal having a propagation time equal to the reference propagation time. A determination is made of the ratio of the actual amplitude to the reference amplitude and comparison of the ratio with a threshold value which is dependent on the visibility to be determined. A comparison is made between the signal waveform of the actual signal with standard waveforms for various visibility states of the measurement path. The comparison results are logically linked in order to produce a switching and/or warning signal to indicate a visibility undershoot or a measurement disturbance.

14 Claims, 2 Drawing Sheets

RELATIVE VISIBILITY MEASURING PROCESS AND DEVICE

BACKGROUND OF THE INVENTION

1. Field of the Invention

The invention relates to a relative visibility measuring process and device.

2. Description of the Related Art

The requirement for fog measurement or visibility determination which is as error-free as possible results from various public regulations. Thus, for example, a minimum visibility in [m] corresponds to a prescribed speed limit in [h/h] of double its numerical value for road traffic in the Federal Republic of Germany. A special regulation in the StVO [Road Traffic Act] is that a maximum speed of 50 [h/h] must be observed in a visibility of less than 50 [m]. Takeoff and landing bans come into force at airfields if specific visibilities are not achieved. Exact and reliable test equipment is required to comply with and monitor these regulations.

Apparatuses for fog measurement on the basis of a transillumination process are known, which comprise a transmitter and a receiver which is arranged a short distance away from the transmitter (approximately 1 [m] to approximately the roadway width). In ideal visual conditions, the signals transmitted by the transmitter are detected by a specific signal amplitude. The received signals are attenuated by absorption and scatter in fog, rain, smoke etc. The signal attenuation becomes greater the thicker the fog or the like, that is to say the shorter the visibility. A fog warning is initiated if a specific signal threshold is not achieved.

Incorrect measurements in the form of unknown situations which limit the visibility, such as fog, for example, and fog warnings caused by them can result from the occurrence of locally limited "fog pockets" in the relatively short measurement path.

Since the transmitter and the receiver are mounted on a robust beam, which as a rule is metallic, the effect of such "fog pockets" can additionally be caused by the test equipment itself in unfavorable weather (for example, a rapid rise in the air temperature, particularly after a cold night) as a result of condensation of the fog droplets on the large cold mass of the beam.

On the other hand, incorrect measurements in the form of incorrect fog warnings, that is to say without any fog or the like occurring, can be caused by contamination of the outer surfaces of the transmitter and receiver since such contamination also leads to attenuation of the received signals and thus to the initiation of the false fog warning.

A false fog warning is likewise initiated if an obstruction comes between the transmitter and receiver (for example, a bird). The attenuation of the received signals caused by the obstruction likewise initiates a false fog warning.

It is not possible to differentiate between the above-mentioned measurement disturbances and the actual fog warnings using the transillumination process described.

Another process, which is disclosed in DE-AS 21 56 063, comprises different reflectors being positioned at different distances from a transmitting/receiving device. The reflection properties of these reflectors are selected such that the received signals from all the reflectors are of equal magnitude at a specific reference visibility. The received signals can be distinguished on the basis of their range-dependent propagation time. If the signal level which applies to the reference visibility is not achieved, the range of the associated reflector defines the maximum visibility.

The distances between the reflectors, which are located on a line, must be selected to be relatively large in order to be able to separate the received signals from one another reliably and to avoid over driving effects in the receiving device. The visibility determination is thus relatively coarse.

DE-AS 25 13 061 describes a development in which the reflectors which are erected at different intervals are laterally offset with respect to one another. The transmitting/receiving unit scans the reflectors successively so that the scan position defines the respectively illuminated reflector. The number of reflectors which are "visible" at a preselected signal amplitude defines the visibility. The measurement disturbances already mentioned for the transillumination process can also not be identified here.

In addition, apparatuses for fog measurement are known which operate using a scattered light process. They comprise a transmitter and a receiver which are arranged alongside one another. The receiver detects elements of the signals transmitted from the transmitter (generally light) only when there are back-scattering particles, for example fog or the like, in front of the transmitter/receiver arrangement. The magnitude of the back-scattered signal element depends on the number of fog droplets acting as scatter centers, that is to say the density of the fog, and thus on the visibility. If the received signals exceed a specific signal threshold, a fog warning is initiated. Since the amplitude of the received signals caused by backscatter are only small, the signal threshold must likewise be selected to be low. As a consequence, sufficiently large received signals and thus false warnings can also be initiated by fixed obstructions at a relatively long distance having a good reflection capability in the measurement beam path.

On the other hand, if fog is actually present, the back-scatter signals can be attenuated by contamination of the outer surfaces of the transmitter and receiver to such an extent that the received signals do not exceed the warning threshold. A required fog warning is thus not initiated.

Those apparatuses which operate using the scattered light process can thus also not distinguish between measurement disturbances and actual visibility limiting situations.

SUMMARY OF THE INVENTION

The invention is based on the object of specifying a relative visibility measuring process and device which, in addition to the detection and indication of fog, rain, snow, smoke etc., preclude incorrect indications resulting from measurement disturbances and are intended to indicate the type of a measurement disturbance source. In addition, the system is intended to be capable of being constructed in a very simple way at the measurement site, using elements which are present anyway.

This object is achieved, according to the invention, by a relative visibility measuring process. A first step involves measurement and storage of a reference propagation time of a measurement pulse over a reference distance between a pulse propagation time rangefinder and any reflector under ideal conditions. A second step involves measurement and storage of a reference amplitude of a measurement pulse, which is reflected by the reflector, under ideal conditions. A third step involves measurement and storage of an actual signal which is equal to the time response of the received signals of the pulse propagation time rangefinder under actual conditions. A fourth step involves determination of an actual amplitude which is equal to the amplitude of the time element of the actual signal having a propagation time equal to the reference propagation time. A fifth step involves determination of the ratio of the actual amplitude to the reference amplitude and comparison of the ratio with a threshold value which is dependent on the visibility to be determined. A sixth step involves comparison of the signal waveform of the actual signal with standard waveforms for states, which influence the visibility, of the measurement path to the reflector. A seventh step involves logically linking the comparison results in order to produce a switching and/or warning signal for the case of a visibility undershoot or a measurement disturbance. A device for carrying out this process is specified in a device for carrying out the relative visibility measuring process. The device includes a rangefinder which operates on the pulse propagation time principle. The device also includes any reflector at a reference range from the rangefinder. The device further includes control electronics for sequence control of process steps having a bidirectional input/output. The device includes a reference memory for storing a reference amplitude and a reference propagation time having an input which is connected to the control electronics and to the rangefinder, furthermore having a first output for outputting the reference propagation time and a second output for outputting the reference amplitude. The device includes an actual memory for storing an actual signal and an actual amplitude having a first input which is connected to the control electronics and to the rangefinder, having a second input for receiving the reference propagation time supplied from the reference memory, furthermore a first output for emitting the actual signal and having a second output for emitting the actual amplitude. The device also includes a threshold value memory. The device further includes a divider having two inputs and one output, to whose divisor input the reference amplitude supplied from the reference memory is passed and to whose dividend input the actual amplitude supplied from the actual memory is passed. The device still further includes a comparator having two inputs and one output, to whose first input the output signal of the divider is passed and to whose second input the threshold value supplied from the threshold value memory is passed, and whose output supplies a TRUE signal for the case in which the ratio of the actual amplitude to the reference amplitude undershoots the threshold value. The device includes a signal waveform comparator having an internally stored standard waveform which corresponds to an amplitude response, which is specific to soft targets, of the received signals of the rangefinder, and having an input via which the actual signal interrogated from the actual memory is supplied, and having an output which supplies a TRUE signal in the event of waveform correspondence between the standard waveform and regions of the actual signal. The device also includes a first AND gate to whose first input the output signal of the signal waveform comparator is supplied and to whose second input the output signal of the comparator is supplied, and whose output signal initiates a switching and/or warning signal having the tag "visibility undershoot" in the "TRUE" case. The device further includes an invertor to whose input the output signal of the signal waveform comparator is passed. The device still further includes a second AND gate to whose first input the output signal of the invertor is supplied and to whose second input the output signal of the comparator is supplied, and whose output signal initiates a switching and/or warning signal having the tag "measurement disturbance" in the "TRUE" case. Advantageous developments of the process and advantageous designs of the device result from the respective sub claims.

In the Drawings The process according to the invention and the device according to the invention are described in the following text with reference to an exemplary embodiment, which is illustrated schematically in the drawing, for a suitable relative visibility measuring device, in which drawing, FIG. 1: shows an exemplary embodiment of a device according to the invention;

FIG. 2: shows an actual signal in good visibility;

FIG. 3: shows an actual signal in the presence of a visibility undershoot resulting from fog which has occurred;

FIG. 4: shows an actual signal in the present of a measurement disturbance resulting from an obstruction within the reference range.

DETAILED DESCRIPTION OF THE PREFERRED EMBODIMENTS

Figure 1:
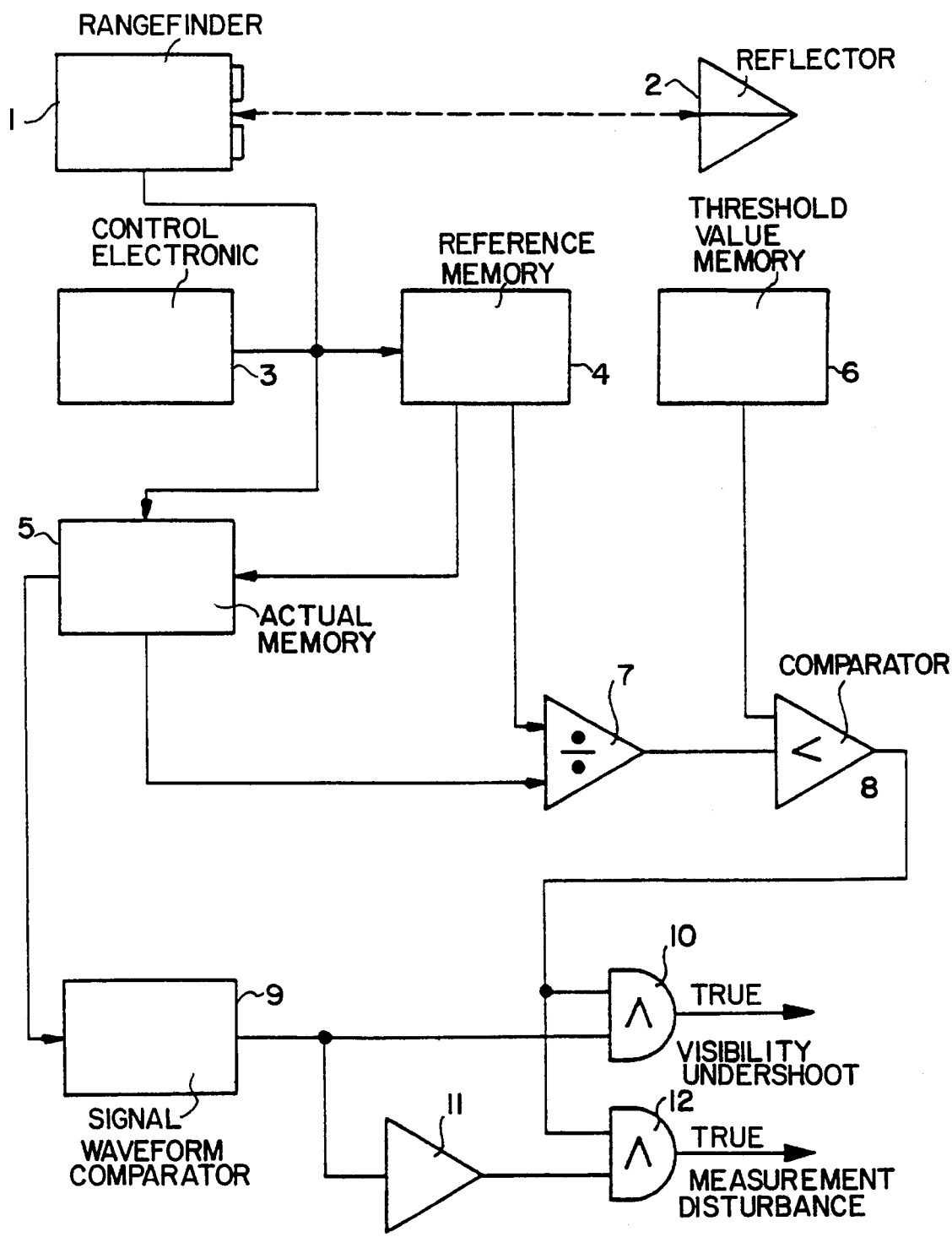

The invention offers the advantage of the measurement system being self-monitoring. It is possible to distinguish a visibility undershoot from a measurement disturbance and thus to preclude incorrect warnings. Service functions to correct the measurement disturbance can be requested or initiated automatically by the detection and indication of measurement disturbances.

The invention is based on the knowledge that rangefinders which operate using the pulse propagation time principle on the one hand detect the signal attenuation, which is utilized in the abovementioned transillumination process, in the transmitted pulse. On the other hand, such apparatuses also allow the reception of the signal waveform of the pulse which has passed over the measurement path. Scatter centers or reflective obstructions within the measurement path produce signals which occur earlier in time than the pulse which has passed over the regular measurement path. The signals which are sought using the abovementioned scattered-light process can thus also be evaluated simultaneously. It is in this case assumed that specific situations on the measurement path which influence the visibility produce a typical response of the received signals which arrive earlier in time. Standard waveforms in the signal response can be assigned to such situations. A qualitative statement, for example, on the presence or absence of fog or an obstruction can then be made by comparing the detected signal waveform with one or more standard waveforms and, in combination with the quantitative measurement of the signal attenuation, a statement can be obtained on the relative visibility and visibility undershoot. The logical linking of both information items allows measurement disturbances to be identified. A suitable range-finder is described, for example, in the PCT Laid-Open Specification WO 88/05922.

The installation of the measurement system is relatively simple in comparison with known systems, as a result of the inclusion of any desired reflector which already exists at the measurement site. Thus, all the device elements can be integrated in one housing, with the exception of the reflector. This apparatus obtained in this way is then just erected at a distance which is suitable for the visibility to be detected from any desired reflector which is already present at the measurement site (for example a road boundary post, building, pole or the like), and is brought into use. The optical path can be selected to have a sufficient length such that the measurement is not corrupted by local inhomogeneities ("pockets") in, for example, fog.

Once the rangefinder and the reflector have been positioned at the required mutual distance apart, a reference measurement is initially carried out. A range measurement is carried out for this purpose in ideal conditions, that is to say with good visibility and with clean outer surfaces on the reflector and rangefinder. The range value obtained is designated the reference range, and the associated pulse propagation time is designated the reference propagation time. The amplitude value obtained for the measurement pulse reflected by the reflector is designated the reference amplitude. The reference propagation time and the reference amplitude are stored as a comparison standard for the visibility determination relative to the reference range.

A time response of the received signals of the pulse propagation time rangefinder, which response is designated the actual signal, is then measured and stored in actual conditions, that is to say in any given visibility quality and with any given cleanliness of the outer surfaces of the rangefinder and reflector.

After this, the amplitude of that time element of the actual signal which has a propagation time equal to the reference propagation time is retrieved from the relevant memory. This amplitude is designated the actual amplitude. The actual amplitude is thus the amplitude of that time element of the actual signal which returns from the reference range, that is to say after reflection on the reflector, to the rangefinder. Since, if objects which are external to the system, for example, occur within the reference range, a portion of the measurement pulse is reflected on these objects, the actual amplitude is in these cases attenuated in comparison to ideal visual conditions. The portion of the measurement pulse which is reflected on the objects external to the system then, however, causes additional amplitude elements in the actual signal, with propagation times which are less than the reference propagation time.

The ratio between the actual amplitude and the reference amplitude is formed. The numerical ratio is compared with a threshold value which represents the measure of signal attenuation at the reference range beyond which fog, for example, shortens the visibility. Thus, if the ratio of the actual amplitude to the reference amplitude is below the threshold value, the condition for an apparently existing visibility undershoot is satisfied.

In order to check whether a visibility undershoot is actually present, the actual signal is investigated to determine whether an amplitude response which is specific to soft targets is present in a range having propagation times less than the reference propagation time. Such an amplitude response which is specific to soft targets is asymmetric and is characterized, for example, by a flank which is described by an exponential function. This is based on the fact that soft targets, such as fog, rain, snow, smoke etc., for example, have no reflection surface, but that scattering takes place on the individual spatially distributed particles of the soft target (for example, fog droplets, snowflakes).

In comparison with a random reflector (post, building, etc.), a hard target has a known, macroscopic reflection surface. This leads to an amplitude response which is specific to hard targets, namely a symmetric amplitude response, in the region of the actual signal, with propagation times less than the reference propagation time. An amplitude response which is specific to hard targets generally has a Gaussian distribution.

If both conditions for a visibility undershoot which is actually present are now satisfied, that is to say if 1. the ratio of the actual amplitude to the reference amplitude is less than the threshold value, and, at the same time 2. regions of the actual signal below the reference propagation time have an amplitude response which is specific to soft targets, a switching and/or warning signal is initiated having the tag "visibility undershoot". As a consequence, an audible or visual fog warning, for example, can be emitted. For example, a speed limit corresponding to the visibility which has been undershot can be activated, or an electronic fog warning sign switched on, for road traffic. At airfields, the fog warning or snowfall warning can be initiated.

If, on the other hand, 1. the ratio of the actual amplitude to the reference amplitude is less than the threshold value (as can also occur, for example, in the event of loss of the system's own reflector)

and, at the same time 2. regions of the actual signal having propagation times less than the reference propagation time have an amplitude response which differs from standard waveforms which are specific to soft targets, a switching and/or warning signal is derived having the tag "measurement disturbance".

If the measurement system gives neither a warning with the tag "visibility undershoot" nor the tag "measurement disturbance", the measurement system is intact and the actual visibility corresponds with the nominal visibility specified by the threshold value. If the threshold value is suitably selected, the nominal visibility can be the same as the reference range.

Advantageous developments of the process result from distinguishing between the possible measurement disturbances.

It is thus possible, for example, for an obstruction, that is to say an additional reflector in the form of, for example, wild animals, passers-by, abandoned vehicles etc., to enter the measurement beam path. This results in an additional amplitude response which is specific to hard targets in a region of the actual signal having propagation times which are less than the reference propagation time. At the same time, the actual amplitude, that is to say the reflex of the system's own reflector, is attenuated. If the reflector is completely covered, the actual amplitude is attenuated to zero. As a consequence, a switching and/or warning signal having the tag "obstruction" is emitted in an advantageous development of the process, for the case when 1. the ratio of the actual amplitude to the reference amplitude is less than the threshold value and, at the same time 2. in the region of the actual signal having propagation times less than the reference propagation time, an amplitude response is specific to hard targets.

A further possible measurement disturbance is the loss of the reflector if, for example, the road boundary post which is being aimed at has been broken. This results in the transmitted measurement pulse not returning or returning from a distance beyond the reference range from the rangefinder. Additional amplitude elements in regions of the actual signal having propagation times less than the reference propagation time then do not occur. A switching and/or warning signal having the tag "reflector loss" is thus emitted in a further variant of the process for the case when all the received signals having propagation times less than or equal to the reference propagation time are equal to a previously defined null signal.

This null signal is defined by a maximum amplitude level, which is selected as desired, above the noise level and thus also defines a standard waveform. Statistical thresholds can be used in this case. For example, the maximum amplitude level can be selected to be n-times the standard deviation of the noise distribution. If the signal peaks of the actual signal are above this maximum amplitude level and above the noise level, the actual signal and the null signal are identified as being unequal.

A typical and frequent measurement disturbance is for the actual amplitude to be attenuated by contamination of the outer surfaces of the rangefinder and of the reflector. In contrast to the "obstruction" case, no additional reflexes, and thus amplitude elements, occur in the actual signal in this case from distances less than the reference range. A switching and/or warning signal having the tag "contamination" is thus emitted in a suitable development of the process for the case when 1. the ratio of the actual amplitude to the reference amplitude is less than the threshold value and, at the same time 2. the actual signal in all the regions having propagation times less than the reference propagation time is equal to a previously defined null signal.

A further development of the process can be used for active traffic flow control, in that the measurement arrangement is arranged in the vicinity of a traffic sign which indicates a speed limit. The reference range is in this case selected to correspond to the speed limit and the minimum visibility represented thereby. If a visibility undershoot is present, the traffic sign is switched on and the traffic flow is thus actively controlled.

Further developments of the abovementioned process result from the idea to carry out the process for a plurality of visibilities and to combine it with a traffic sign which is arranged in the vicinity of the measurement arrangement, can be switched over, indicates a speed limit and in each case indicates the speed limit corresponding to the currently determined visibility. There are various options for checking the various visibilities.

One variant comprises erecting a plurality of reflectors at staggered intervals which correspond to different visibilities. Use of the already existing road boundary posts, which are erected at regular intervals, as reflectors is possible and advantageous.

A reference measurement is initially carried out for each reflector, that is to say the reference propagation time and reference amplitude are determined. Process steps c) to g) of claim 1 are then carried out individually for each reflector, ignoring the reference propagation times of the other reflectors. If a visibility undershoot is detected, the speed limit or corresponding warning information is switched on which is associated with the reflector at the distance corresponding to the shortest visibility which has been undershot.

A second variant of the abovementioned process results by arranging a plurality of reflectors having different reflectances at the same distance from the measurement arrangement. In this case, the respective reflectance is obtained from the product of the reflector area and the degree of reflection. The various reflectances are selected to correspond to staggered visibilities. The reflectors are successively moved into the measurement beam path or are activated, for example, by removing a cover. The process steps are carried out for each individual reflector. If a visibility undershoot is detected, the associated speed limit or corresponding warning information is switched on for that reflector whose reflectance corresponds to the shortest visibility which has been undershot.

A third variant to the two abovementioned processes results by carrying out the process described above using a plurality of threshold values which correspond to staggered visibilities. The associated speed limit or corresponding warning information is then switched on for that threshold value which corresponds to the shortest visibility which has been undershot.

A rangefinder 1 is fitted at the reference range from the reflector 2. It is advantageous to integrate all the device elements in a housing, with the exception of the reflector 2. This integrated device part can then be moved into position with respect to any desired reflector (for example, a road boundary post, building etc.).

Figure 2:
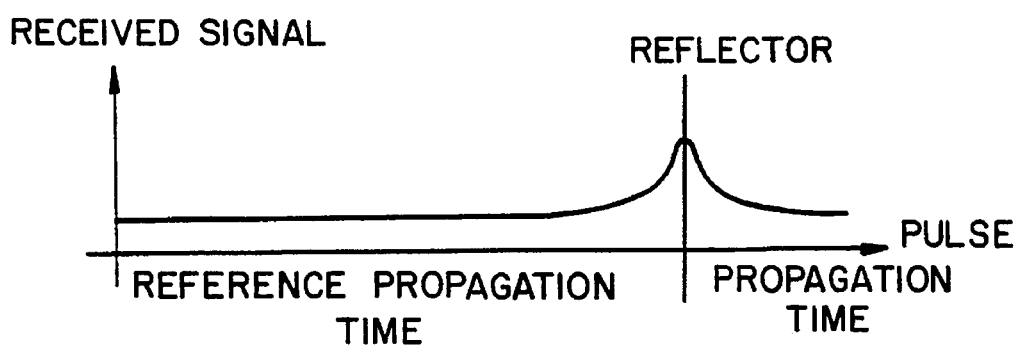

A reference measurement is initially carried out, controlled by control electronics 3, in ideal conditions. The reference propagation time and the reference amplitude are measured in the rangefinder 1. Both are stored in a reference memory 4. Received signals such as those which are illustrated in FIG. 2 are received during the reference measurement.

Initiated by the control electronics 3, an actual signal is then measured and stored in an actual memory 5. In order to retrieve the actual amplitude from the actual memory 5, the value of the reference propagation time is supplied to this actual memory 5 from the reference memory 4.

The actual amplitude, retrieved from the actual memory 5, is passed to the dividend input of a divider 7. The reference amplitude retrieved from the reference memory 4 is passed to the divisor input of the divider 7.

The output signal of the divider 7 is passed to the first input of a comparator 8. A threshold value which has been retrieved from the threshold value memory 6 and has been read in before the start of the measurement is passed to the second input of the comparator 8. The comparator 8 supplies a TRUE signal at its output for the case when the ratio of the actual amplitude to the reference amplitude is less than the threshold value. The first condition for a visibility undershoot or a measurement disturbance is satisfied in this case.

In addition, the actual signal is retrieved from the actual memory 5 and is supplied to a signal waveform comparator 9. A standard waveform, which is specific to soft targets, is stored internally in the signal waveform comparator 9. The signal waveform comparator 9 supplies a TRUE signal at its output in the event of waveform correspondence between the standard waveform and regions of the actual signal.

Figure 3:
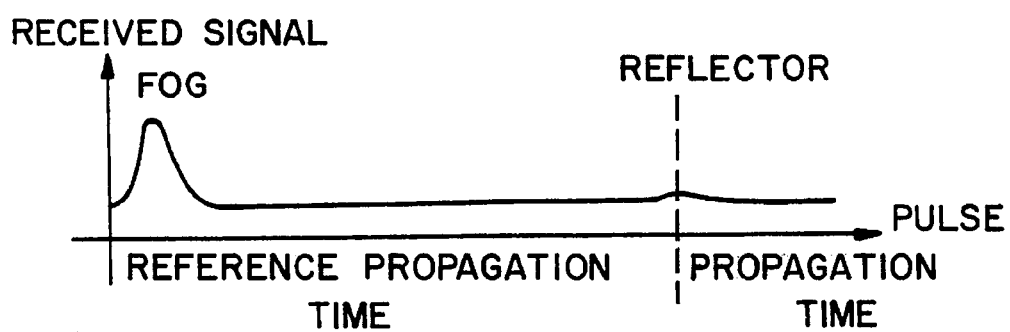

The output signal of the signal waveform comparator 9 is passed both to the first input of a first AND gate 10 and to the input of an invertor 11. The output signal of the comparator 8 is passed to the second input of the first AND gate 10. If this first AND gate 10 receives a TRUE signal at both inputs, it also supplies a TRUE signal at its output and thus initiates a switching and/or warning signal having the tag "visibility undershoot". This corresponds to the situation which is shown in FIG. 3. In this case, the illustrated actual signal shows an actual amplitude which is considerably attenuated in comparison with the reference amplitude. However, in addition, an amplitude response which is specific to soft targets occurs for regions of the actual signal having propagation times less than the reference propagation time. In this example, fog is present, which is characterized by the exponentially falling flank in the signal response.

Figure 4:
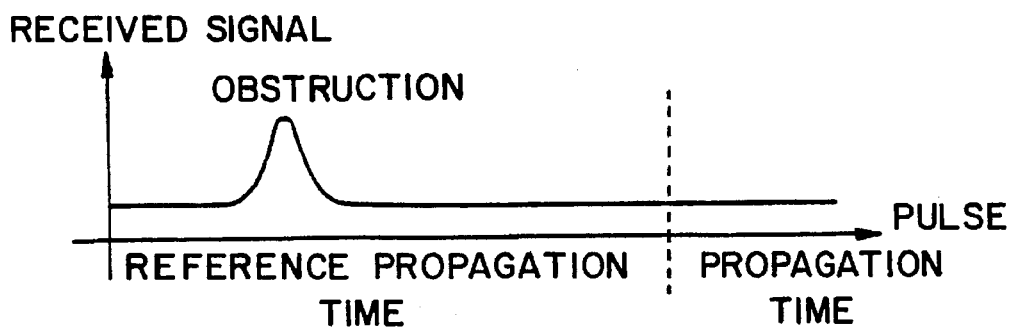

The output signal of the invertor 11 is passed to the first input of a second AND gate 12. The output signal of the comparator 8 is passed to the second input of the second AND gate 12. If both inputs receive a TRUE signal, the second AND gate 12 emits a TRUE signal at its output and thus initiates a switching and/or warning signal having the tag "measurement disturbance". FIG. 4 shows the response of the actual signal in such a case. In this example, an obstruction has moved into the reference path and has completely covered the reflector. The actual amplitude is thus equal to zero. At the same time, an amplitude response which is specific to hard targets occurs in the actual signal.

We claim:

1. A relative visibility measuring process, comprising the steps of:

a) measuring and storing a reference propagation time of a measurement pulse over a reference distance between a pulse propagation time rangefinder and a reflector under ideal conditions, b) measuring and storing a reference amplitude of the measurement pulse, which is reflected by the reflector, under the ideal conditions, c) measuring and storing characteristics of an actual signal which correspond to a time response of a received signal of the pulse propagation time rangefinder under actual conditions, d) determining an actual amplitude which is equal to an amplitude of a time element of the actual signal having a propagation time equal to the reference propagation time, e) determining a ratio of the actual amplitude to the reference amplitude and comparing the ratio with a threshold value which is dependent on a visibility to be determined, f) comparing a signal waveform of the actual signal with standard waveforms for various states, which influence visibility, of a measurement path between the pulse propagation time rangefinder and the reflector, and g) logically linking the comparison results in order to produce a switching and/or warning signal for a case of a visibility undershoot or a measurement disturbance.

2. The process according to claim 1, wherein, the switching and/or warning signal is produced with a tag "visibility undershoot"

when the ratio of the actual amplitude to the reference amplitude is less than the threshold value, and, at a same time, a signal waveform which corresponds with one of the standard waveforms which is specific to soft targets is present in a region of the actual signal having a propagation time less than the reference propagation time.

3. The process according to claim 1, wherein, the switching and/or warning signal is produced with a tag "visibility undershoot"

when the ratio of the actual amplitude to the reference amplitude is less than the threshold value, and, at a same time, a signal waveform which differs from the standard waveforms which are specific to soft targets is present in regions of the actual signal having a propagation time less than the reference propagation time.

4. The process according to claim 1, wherein, the switching and/or warning signal is produced with a tag "obstruction"

when the ratio of the actual amplitude to the reference amplitude is less than the threshold value, and, at a same time, a signal waveform which corresponds with one of the standard waveforms which is specific to hard targets is present in regions of the actual signal having a propagation time less than the reference propagation time.

5. The process according to claim 1, wherein, the switching and/or warning signal is produced with a tag "reflector loss" if a signal waveform which is identical to a standard waveform for a null signal is present in all regions of the actual signal having a propagation time less than or equal to the reference propagation time.

6. The process according to claim 1, wherein, the switching and/or warning signal is produced with a tag "contamination"

when the ratio of actual amplitude to the reference amplitude is less than the threshold value, and, at a same time, a signal waveform which is identical to a standard waveform for a null signal is present in all regions of the actual signal having a propagation time which is less than the reference propagation time.

7. The process according to claim 1, wherein, a traffic sign, which can be switched on and indicates a speed limit corresponding with the visibility to be determined, is mounted in a vicinity of the pulse propagation time rangefinder and is switched on only when the switching and/or warning signal is derived as a result of the visibility undershoot.

8. The process according to claim 1, wherein, a traffic sign which can be switched over and indicates a speed limit corresponding to the visibility to be determined is mounted in a vicinity of the pulse propagation time rangefinder, wherein the reflector includes n reflectors which are erected at staggered intervals corresponding to various visibilities, wherein the associated reference propagation time and the reference amplitude in accordance with the steps a) and b) are measured and stored for each reflector, wherein the steps c) to g) are carried out for each reflector ignoring the associated reference propagation times of the other reflectors, and wherein an associated speed limit for one of the n reflectors which is located with respect to the pulse propagation time rangefinder at a distance corresponding to a shortest visibility undershoot is switched on, or corresponding warning information is given.

9. The process according to claim 1, wherein, a traffic sign which can be switched over and indicates a speed limit corresponding to the visibility to be determined is mounted in a vicinity of the pulse propagation time rangefinder, wherein the reflector includes n reflectors having reflectances which correspond to different visibilities and which are erected at a same distance from the pulse propagation time rangefinder, wherein the n reflectors are selectively activated individually in a beam path between the n reflectors and the pulse propagation time rangefinder, wherein the steps a) to g) are carried out for each reflector, and wherein an associated speed limit for one of the n reflectors whose reflectance corresponds to a shortest visibility undershoot is switched on, or corresponding warning information is given.

10. The process according to claim 1, wherein, a traffic sign which can be switched over and includes a speed limit in accordance with the reference distance is mounted in a vicinity of the pulse propagation time rangefinder, wherein the steps e) to g) are carried out with n threshold values corresponding to different visibilities, and wherein the corresponding speed limit for one of the n threshold values which corresponds to a shortest visibility undershot is switched on, or corresponding warning information is given.

11. An apparatus for carrying out relative visibility measuring process, comprising:

a) a rangefinder (1) which operates on a pulse propagation time principle, b) a reflector (2) at a reference range from the rangefinder (1), c) control electronics (3) for providing sequence control of the process, the control electronics having a bidirectional input/output, d) a reference memory (4) for storing a reference amplitude and a reference propagation time, said reference memory having an input which is connected to the control electronics (3) and to the rangefinder (1), and having a first output for outputting the reference propagation time and a second output for outputting the reference amplitude, e) an actual memory (5) for storing an actual signal and an actual amplitude, said actual memory having a first input which is connected to the control electronics (3) and to the rangefinder (1), having a second input for receiving the reference propagation time supplied from the reference memory (4), having a first output for emitting the actual signal and having a second output for emitting the actual amplitude, f) a threshold value memory (6) for storing a threshold value, g) a divider (7) having a divisor input, a dividend input and an output, the divisor input being supplied with the reference amplitude from the reference memory (4), and the dividend input being supplied with the actual amplitude from the actual memory (5), h) a comparator (8) having a first input, a second input and an output, the first input being supplied with an output signal of the divider (7), the second input being supplied with the threshold value from the threshold value memory (6), the output supplying a TRUE signal for a case in which a ratio of the actual amplitude to the reference amplitude is less than the threshold value, i) a signal waveform comparator (9) having an internally stored standard waveform which corresponds to an amplitude response, which is specific to soft targets, of received signals of the rangefinder (1), and having an input via which the actual signal retrieved from the actual memory (5) is supplied, and having an output which supplies a TRUE signal in an event of waveform correspondence between the standard waveform and regions of the actual signal, j) a first AND gate (10) having a first input, a second input and an output, the first input receiving the output signal of the signal waveform comparator (9), the second input receiving the output signal of the comparator (8), wherein an output signal at the output of the first AND gate initiates a first switching and/or warning signal having a tag "visibility undershoot" in a "TRUE" case, k) an invertor (11) having an input to which the output signal of the signal waveform comparator (9) is passed, the invertor having an output for outputting an output signal, and l) a second AND gate (12) having a first input, a second input and an output, the first input receiving the output signal of the invertor (11), the second input receiving the output signal of the comparator, wherein an output signal at the output of the second AND gate initiates a second switching and/or warning signal having a tag "measurement disturbance" in a "TRUE" case.

12. An apparatus according to claim 11, further comprising:

a) a second signal waveform comparator having a second internally stored standard waveform which corresponds with an amplitude response, which is specific to hard targets, of the received signals of the rangefinder (1), and having an input via which the actual signal which is retrieved from the actual memory (5) is supplied, and having an output which supplies a TRUE signal in an event of waveform correspondence between the second standard waveform and regions of the actual signal, and b) a third AND gate having a first input, a second input and an output, the first input receiving the output signal of the second signal waveform comparator, the second input receiving the output signal of the comparator, wherein an output signal at the output of the third AND gate initiates a third switching and/or warning signal having a tag "obstruction" in a "TRUE" case.

13. An apparatus according to claim 11, further comprising:

a) a second signal waveform comparator having a second internally stored standard waveform which corresponds to a defined null signal, and having an input via which the actual signal which is retrieved from the actual memory (5) is supplied, and having an output which supplies a TRUE signal in an event of waveform correspondence between the second standard waveform and the actual signal, and b) a third AND gate having a first input, a second input and an output, the first input receiving the output signal of the second signal waveform comparator, the second input receiving the output signal of the comparator (8), wherein an output signal at the output of the third AND gate initiates a third switching and/or warning signal having a tag "contamination" in a "TRUE" case.

14. An apparatus according to claim 11, further comprising; a second signal waveform comparator having an internally stored second standard waveform which corresponds to a defined null signal, and having an input via which the actual signal retrieved from the actual memory (5) is supplied, having an output which supplies a TRUE signal in an event of waveform correspondence between the second standard waveform and the actual signal, wherein the TRUE signal is used to create a third warning and/or switching signal having a tag "reflector loss".

* * * * *